(12) United States Patent
Smith

(10) Patent No.: US 11,499,650 B2
(45) Date of Patent: Nov. 15, 2022

(54) LOCKOUT TAGOUT DEVICE AND VALVE

(71) Applicant: Parker-Hannifin Corporation, Cleveland, OH (US)

(72) Inventor: Zachary Spencer Smith, Tucson, AZ (US)

(73) Assignee: Parker-Hannifin Corporation, Cleveland, OH (US)

( * ) Notice: Subject to any disclaimer, the term of this patent is extended or adjusted under 35 U.S.C. 154(b) by 928 days.

(21) Appl. No.: 16/305,562

(22) PCT Filed: Jul. 12, 2016

(86) PCT No.: PCT/US2016/041883
§ 371 (c)(1),
(2) Date: Nov. 29, 2018

(87) PCT Pub. No.: WO2018/013087
PCT Pub. Date: Jan. 18, 2018

(65) Prior Publication Data
US 2020/0347958 A1 Nov. 5, 2020

(51) Int. Cl.
*F16K 35/10* (2006.01)
*F16K 7/16* (2006.01)
(Continued)

(52) U.S. Cl.
CPC .............. *F16K 35/10* (2013.01); *F16K 7/16* (2013.01); *F16K 31/508* (2013.01);
(Continued)

(58) Field of Classification Search
CPC .......... F16K 35/10; F16K 35/04; F16K 35/06; F16K 7/16; F16K 31/508;
(Continued)

(56) References Cited

U.S. PATENT DOCUMENTS 2,309,304 A   1/1943   Creighton
3,030,975 A   4/1962   Mueller
(Continued)

FOREIGN PATENT DOCUMENTS

CN   203223584 U   10/2013
EP    0347289 A1   12/1989
(Continued)

OTHER PUBLICATIONS

International Search Report and Written Opinion of the International Searching Authority, International Application No. PCT/US2016/041883, dated Feb. 20, 2017.
(Continued)

*Primary Examiner* — Patrick C Williams
(74) *Attorney, Agent, or Firm* — Renner, Otto, Boisselle & Sklar, LLP

(57) ABSTRACT

A valve assembly including a valve housing and a handle that is movable about an actuation axis to actuate a valve actuator within the valve housing between an open position and a closed position. The handle has a first opening and the valve housing has a second opening. When the valve actuator is in the closed position the first opening aligns with the second opening to enable receipt of a lockout member that prevents movement of the valve actuator from the closed position to the open position.

15 Claims, 8 Drawing Sheets

(51) Int. Cl.
| | |
|---|---|
| *F16K 31/50* | (2006.01) |
| *F16K 31/524* | (2006.01) |
| *F16K 35/06* | (2006.01) |
| *F16K 37/00* | (2006.01) |
| *F16K 35/04* | (2006.01) |
| *F16K 31/60* | (2006.01) |
| *F16K 27/02* | (2006.01) |

(52) U.S. Cl.
CPC .. *F16K 31/52408* (2013.01); *F16K 31/52491* (2013.01); *F16K 31/60* (2013.01); *F16K 35/04* (2013.01); *F16K 35/06* (2013.01); *F16K 37/0008* (2013.01); *F16K 27/02* (2013.01)

(58) Field of Classification Search
CPC ......... F16K 31/52408; F16K 31/52491; F16K 31/60; F16K 37/008; F16K 27/02
See application file for complete search history.

(56) References Cited

U.S. PATENT DOCUMENTS

| | | | |
|---|---|---|---|
| 4,000,684 A | 1/1977 | Ruffley | |
| 5,143,114 A | 9/1992 | Daniels | |
| 5,427,135 A | 6/1995 | Kieper | |
| 5,819,791 A * | 10/1998 | Chronister | F16K 15/1821 251/83 |
| 5,950,462 A | 9/1999 | Neeley | |
| 6,152,161 A | 11/2000 | Yokota et al. | |
| 6,189,350 B1 * | 2/2001 | Nishimura | F16K 35/10 70/180 |
| 6,648,296 B2 * | 11/2003 | Hirose | F16K 27/003 251/77 |
| 9,010,721 B2 | 4/2015 | Hoots et al. | |
| 2001/0052362 A1 * | 12/2001 | Hasak | F16K 7/16 137/553 |
| 2005/0092367 A1 * | 5/2005 | Espinoza | F16K 35/06 137/383 |
| 2006/0260694 A1 | 11/2006 | Brill et al. | |
| 2012/0193558 A1 | 8/2012 | Hoots et al. | |
| 2015/0344288 A1 | 12/2015 | Collado | |

FOREIGN PATENT DOCUMENTS

| | | |
|---|---|---|
| FR | 2633028 A1 | 12/1989 |
| JP | 07-301363 A | 11/1995 |
| JP | 2001329581 A | 11/2001 |
| JP | 2005344918 A | 12/2005 |
| JP | 2007-139057 A | 6/2007 |
| JP | 2009-036228 A | 2/2009 |
| JP | 2010-255663 A | 11/2010 |
| JP | 201684825 A | 5/2016 |

OTHER PUBLICATIONS

Written Opinion of the International Preliminary Examining Authority, International Application No. PCT/US2016/041883, dated Jun. 1, 2018.

International Preliminary Report on Patentability, International Application No. PCT/US2016/041883, dated Oct. 12, 2018.

Original and English Summary Translation of Japanese Office Action dated Jan. 29, 2021, for corresponding Japanese Patent Application No. 2018-568732.

European Search Report dated Dec. 14, 2020 for related European Application No. 20203061.5.

* cited by examiner

LOCKOUT TAGOUT DEVICE AND VALVE

This application is a national phase of International Application No. PCT/US2016/041883 filed Jul. 12, 2016.

FIELD OF INVENTION

The present invention relates generally to lockout tagout devices, and more particularly to a lockout tagout device for a valve.

BACKGROUND

Lockout tagout devices are used in a variety of applications to lockout access to a component of a machine for example during maintenance to prevent release of hazardous energy sources, whether chemical, hydraulic, pneumatic or thermal. Following lockout, a warning tag may be used to indicate that the energy isolating component and the machine being controlled may not be operated until the tag is removed and the component unlocked. One such application may be a semiconductor manufacturing machine in which the component may be a valve that controls the flow of a gas or liquid to, from, or in the machine. During maintenance, the valve may be closed and the lines disconnected or purged to remove hazardous energy contents.

Some existing lockout tagout devices have various shortcomings, drawbacks, and disadvantages relative to certain applications. For example, for valve applications the valve may require additional hardware to facilitate a lockout tagout. In some applications, the valve may be locked out only in an open position. Accordingly, there remains a need for further contributions in this area of technology.

SUMMARY OF INVENTION

The present invention is directed to a lockout tagout device that is incorporated into the structure of a valve assembly and enables the valve assembly to be locked out in a closed position. According to one aspect of the invention, a valve assembly includes a valve housing; and a handle that is movable about an actuation axis to actuate a valve actuator within the valve housing between an open position and a closed position. The handle has a first opening and the valve housing has a second opening. When the valve actuator is in the closed position the first opening aligns with the second opening to enable receipt of a lockout member that prevents movement of the valve actuator from the closed position to the open position.

Embodiments of the invention may include one or more of the following additional features separately or in combination.

When the valve actuator is in the open position the first opening may be out of alignment with the second opening.

The first and second openings may extend transverse to the actuation axis.

The first and second openings may be oriented perpendicular to the actuation axis.

The first and second openings may be oriented at a non-zero angle relative to a horizontal plane perpendicular to the actuation axis.

The non-zero angle may be about 2.5 to 3 degrees.

The valve actuator may be a multi-turn actuator.

The valve assembly may further include an indicator stem configured for slidable movement relative to the handle in response to movement of the handle. The indicator stem may have a third opening. When the valve actuator is in the closed position the first opening may align with the third opening to enable receipt of the lockout member to prevent movement of the valve actuator from the closed position to the open position.

When the valve actuator is in the open position the first opening may be out of alignment with the third opening.

When the valve actuator is in the open position the first and second openings may be out of alignment with the third opening.

When the valve actuator is in the open position the first opening may be out of alignment with the second opening.

The indicator stem may have a cam that slides through a vertically extending opening in a wall of the handle as the handle moves to actuate the valve actuator between the closed position and the open position.

The handle may have a pair of first openings at opposite sides of the handle and the valve housing may have a pair of second openings at opposite sides of the valve housing. When the valve actuator is in the closed position the pair of first openings, the pair of second openings, and the third opening may be aligned to enable receipt of the lockout member.

The first opening may angularly align with the second opening about the actuation axis when the valve actuator is in the closed position.

The position of the first opening when the valve actuator is in the open position may be 90 degrees away from the position of the first opening when the valve actuator is in the closed position.

The first opening may axially align with the second opening along the actuation axis when the valve actuator is in the closed position.

When the valve actuator is in the open position the first opening may be axially above the second opening along the actuation axis.

The valve actuator may be a quarter turn actuator.

As another feature, the valve assembly can be locked out only when the valve actuator is in the closed position.

The foregoing and other features of the invention are hereinafter described in greater detail with reference to the accompanying drawings.

DETAILED DESCRIPTION

Figure 1:
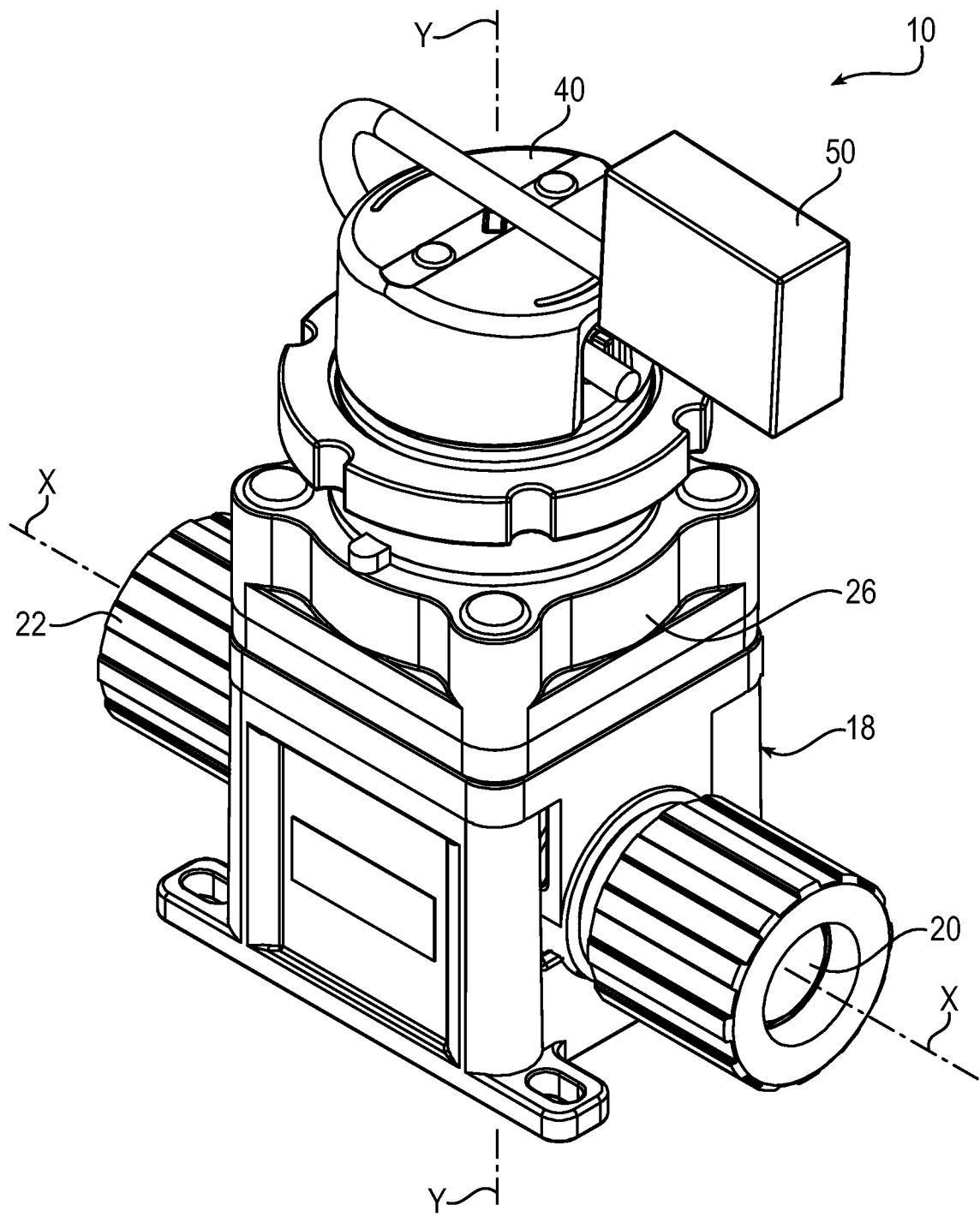
FIG. 1 is a perspective view of an exemplary valve assembly in accordance with the invention.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

FIGS. 1-4 show an exemplary valve assembly 10 and lockout tagout device 12 in accordance with one aspect of the invention. The illustrated valve assembly 10 includes a diaphragm type valve suitable for high purity gas/fluid systems such as may be required in semiconductor manufacturing applications. As will be appreciated, the valve assembly 10 and lockout tagout device 12 are not limited to the particular configuration shown in FIGS. 1-4, and other embodiments are contemplated. For example, the lockout tagout device 12 may be used in conjunction with other types of valve assemblies, as well as in conjunction with components other than valves. Further, although the illustrated valve assembly 10 is actuated manually, it will be appreciated that the valve assembly 10 may be controlled by other or additional types of actuation, including for example electric, pneumatic and/or hydraulic.

Figure 2:
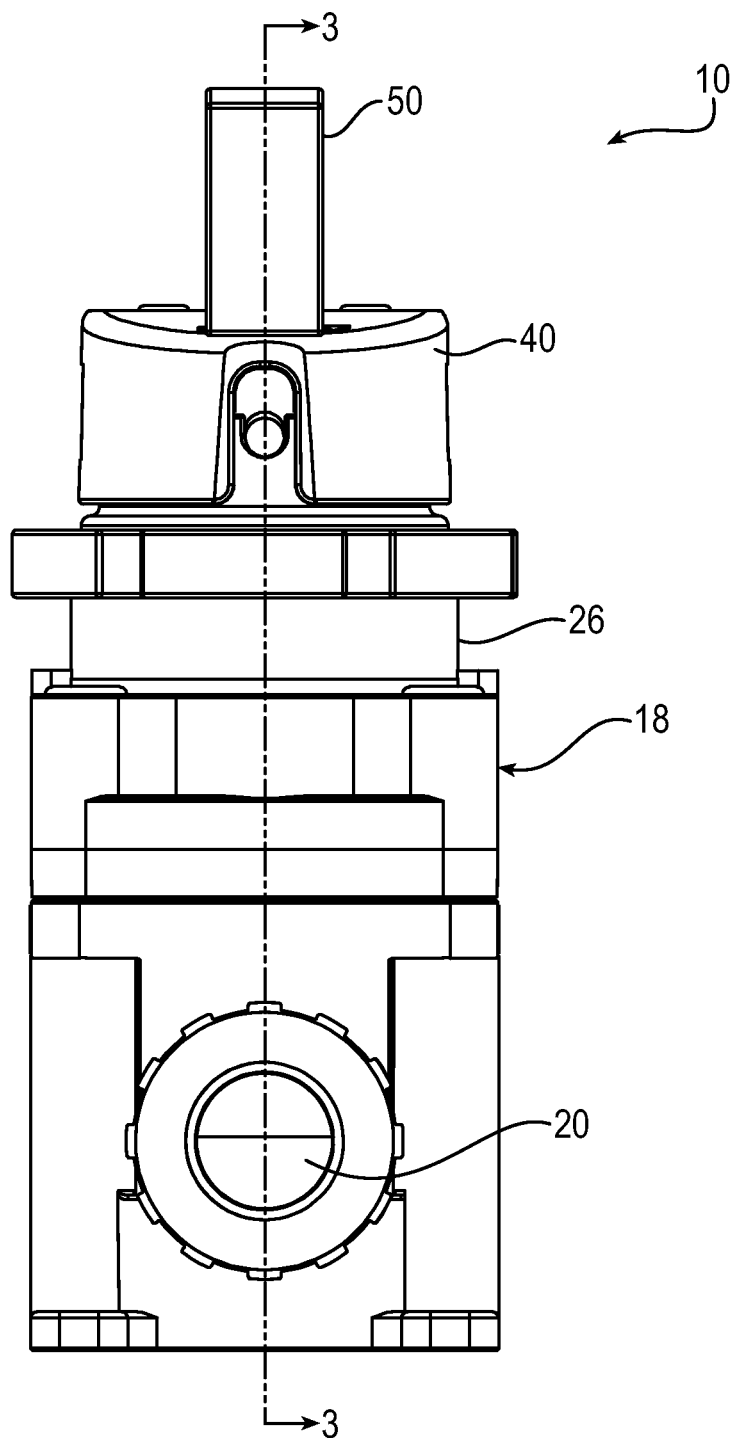
FIG. 2 is a right side end view of the FIG. 1 valve assembly.
Figure 3:
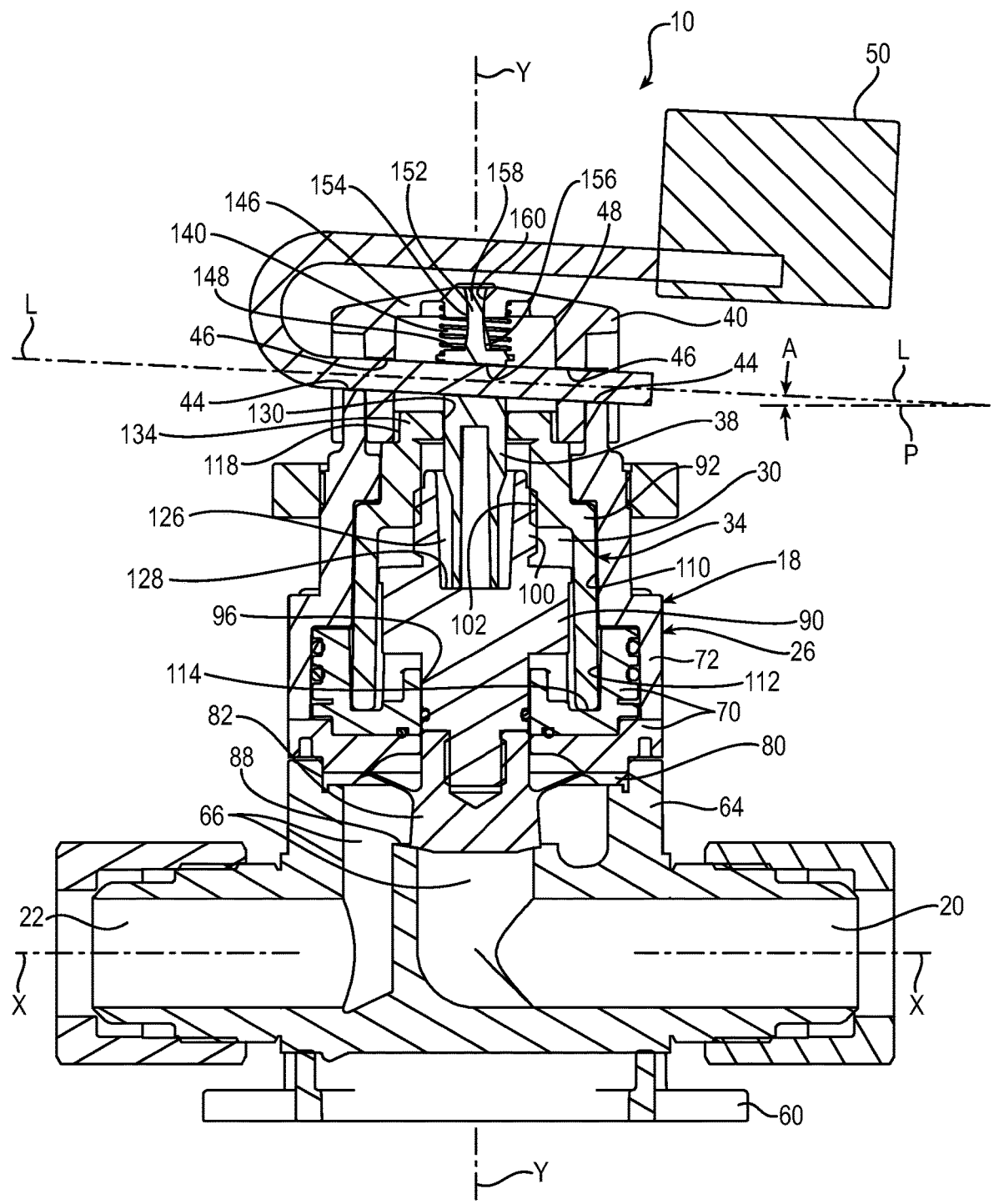
FIG. 3 is a cross sectional view of the FIG. 1 valve assembly as viewed from the line 3-3 in FIG. 2, showing the valve assembly in an open position.
Figure 4:
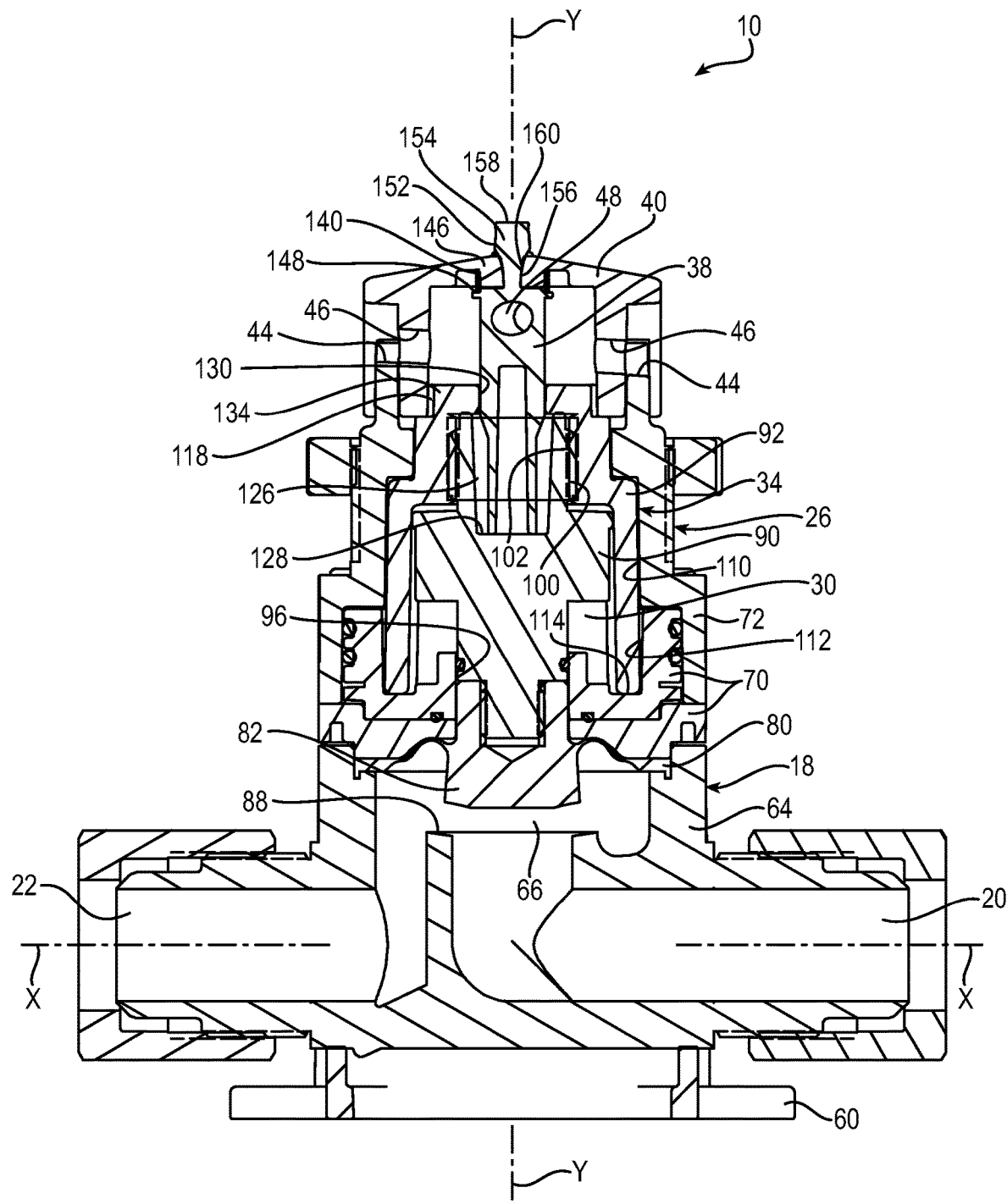
FIG. 4 is a cross sectional view of the FIG. 1 valve assembly as viewed from the line 3-3 in FIG. 2, but with the valve assembly in a closed position.
Figure 5:
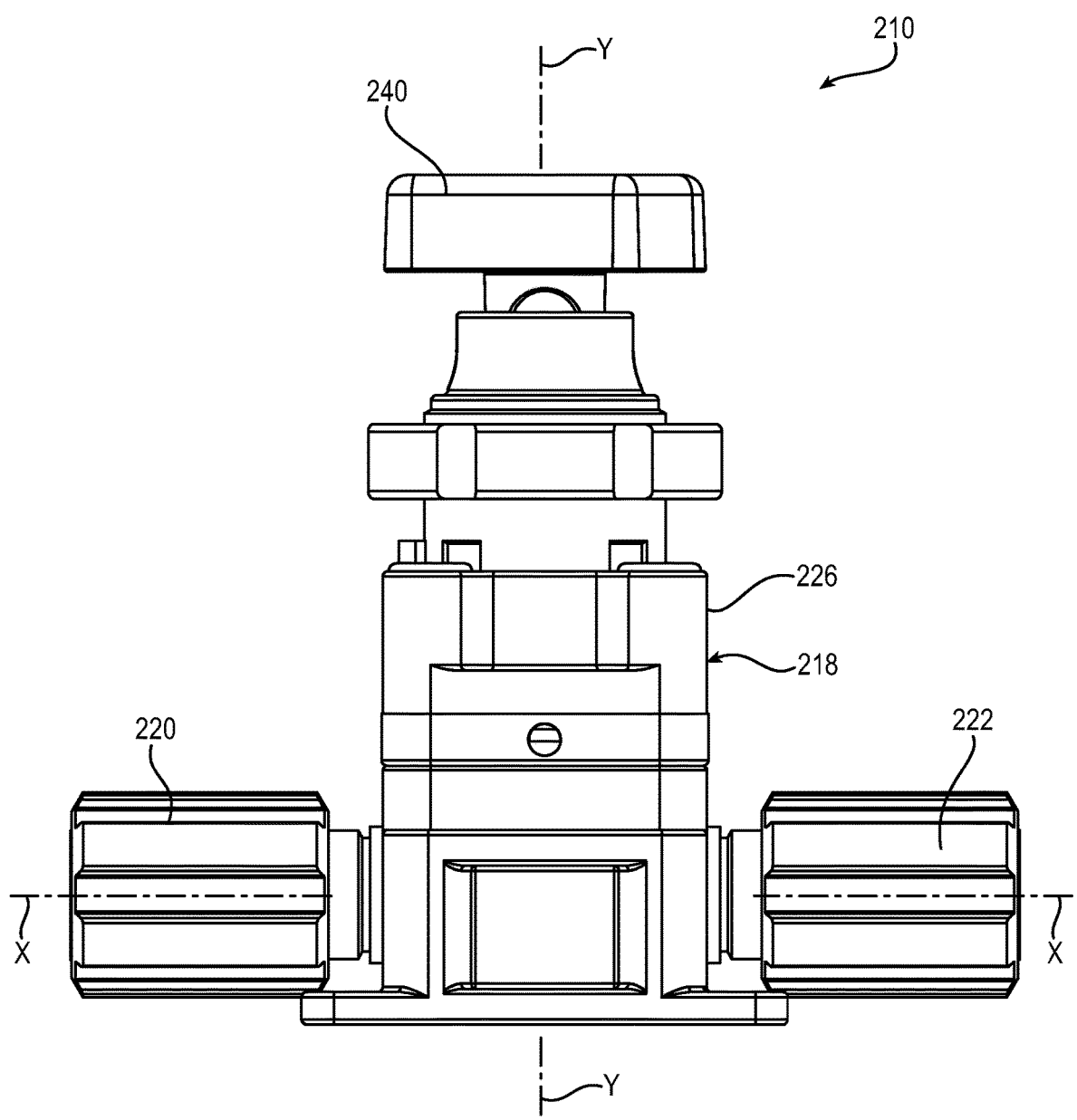
FIG. 5 is a front elevational view of another exemplary valve assembly in accordance with the invention.
Figure 6:
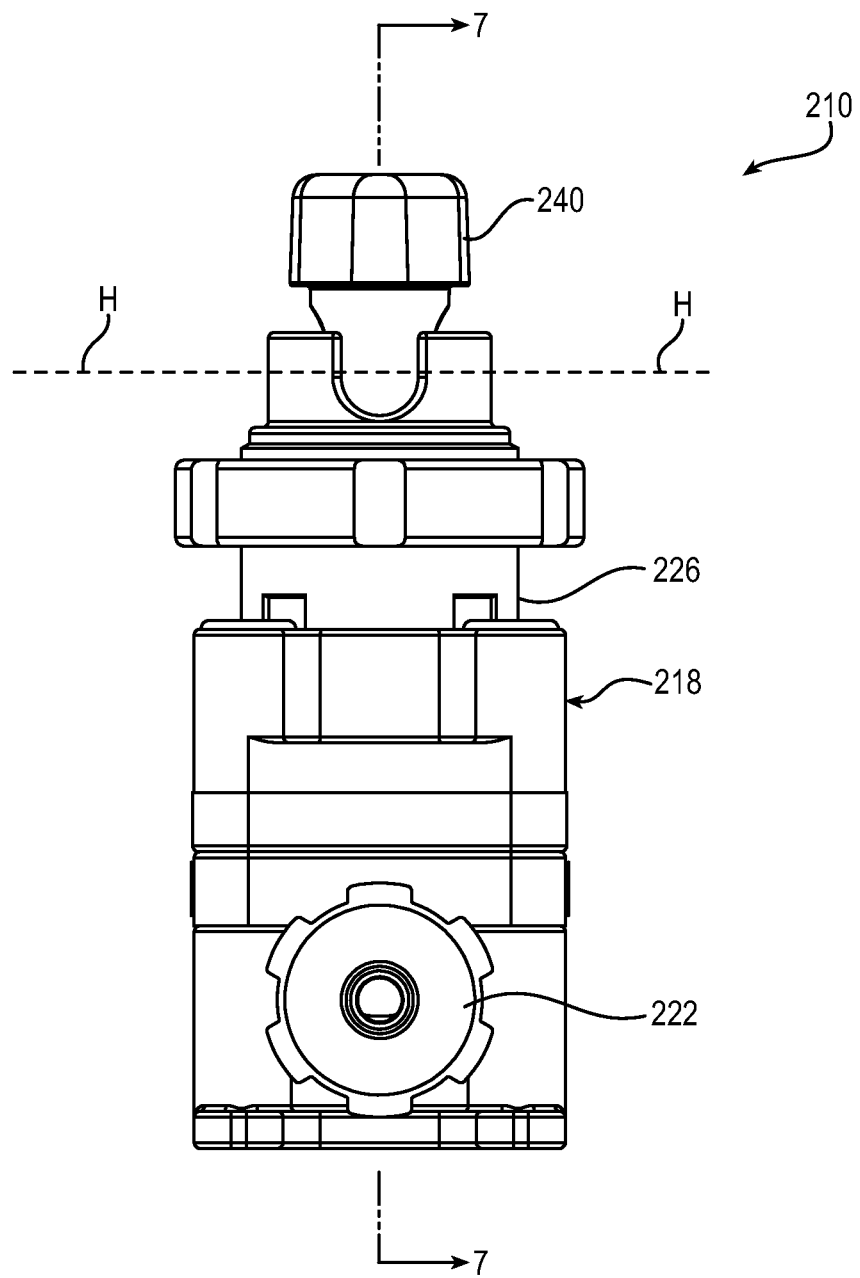
FIG. 6 is a right side end view of the FIG. 5 valve assembly.

The valve assembly 10 includes a valve housing 18 that has an inlet port tube 20 and an outlet port tube 22 along a generally longitudinal axis X and a central body 26 along a generally vertical axis Y. The central body 26 includes a valve chamber 30 in which a valve actuator 34 is supported for movement between closed and open positions to respectively close and open the valve assembly 10 as shown in FIGS. 3 and 4. A handle 40 is coupled to the valve actuator 34 to move the valve actuator 34 between the closed and open positions. An indicator stem 38, in turn, is configured for slidable movement relative to the handle 40 in response to movement of the handle 40. The valve housing 18, the handle 40, and the indicator stem 38 have respective openings 44, 46, 48 that can be moved into and out of alignment by rotation of the handle 40. As will be described in greater detail below, turning the handle 40 to move the valve actuator 34 to a closed position has the effect of moving the openings 44, 46, 48 into alignment. In such closed state, as shown in FIG. 3, a lockout member such as a lock 50 can be inserted through the openings 44, 46, 48 (and tagged if desired) to prevent unexpected or unauthorized access to the valve assembly 10, for example during maintenance thereof. On the other hand, turning the handle 40 to move the valve actuator 34 to any variety of open positions has the effect of moving the openings 44, 46, 48 out of alignment. In such open states, as shown for example in FIG. 4, the valve assembly 10 cannot be locked out. In the illustrated embodiment of FIGS. 1-4, the valve assembly 10 can be locked out tagged out in the closed position, and the lockout tagout feature is incorporated into the valve assembly 10 itself.

Referring now in greater detail to FIGS. 3 and 4, the valve housing 18 includes a base plate 60 and a valve body 64 mounted thereon. The valve body 64 includes the inlet and outlet port tubes 20, 22, shown respectively in the right and left in FIGS. 3 and 4, and an intermediate passage 66 forming a bottom portion of the valve chamber 30. The central body 26 of the valve housing 18 includes a lower housing 70 and an upper housing 72, which together define an upper portion of the valve chamber 30. As will be appreciated, the intermediate passage 66 enables fluid communication between the inlet and outlet port tubes 20, 22. As will further be appreciated, either port tube 20 or 22 can function as an inlet or outlet port tube. The valve housing 18 can be made of any suitable material including polytetrafluoroethylene, stainless steel, or a hard thermoplastic such as ETFE or PVDF.

The valve actuator 34, mounted within the chamber 30, includes a diaphragm 80 that separates the upper and lower portions of the valve chamber 30. The diaphragm 80 is supported at its edge by the lower housing 70 above and the valve body 64 below. The diaphragm 80 includes a centrally located plug 82 and is made of a suitable material such as PTFE, PFA, variations thereof, and/or other materials, to enable flexible vertical movement of the plug 82 along the Y axis. The plug 82 is adapted for sealing against a valve seat 88 of the valve body 64. The plug 82 is moveable between the closed position (FIG. 3) and the open position (FIG. 4) whereat fluid can flow from the inlet port tube 20, through the intermediate passage 66, and to the outlet port tube 22.

The valve actuator 34 includes a piston 90 and a piston driver 92. The piston 90 is mounted for slidable movement along the Y axis within a bore 96 of the lower housing 70. At its lower end, the piston 90 is fixedly connected to the diaphragm 80 so that upward and downward movement of the piston 90 causes upward and downward flexure in the diaphragm 80 and corresponding sealing and unsealing of the plug 82 relative to the valve seat 84. At its upper end, the piston 90 has a driven thread 100 that threadingly mates with a driver thread 102 of the piston driver 92. The piston driver 92 is supported for rotational movement by internal surfaces 110, 112, 114 in the lower and upper housings 70, 72. The handle 40, in turn, is coupled to the upper end of the piston driver 92, for example via a spline connection at 118, so that rotation of the handle 40 causes rotation of the piston driver 92. Owing to the threaded coupling between the driven and driving threads 100, 102 of the respective piston 90 and piston driver 92, clockwise and counterclockwise rotation of the handle 40 serves to drive the piston 90 respectively downward and upward, which, in turn, urges the diaphragm 80 and plug 82 to respectively close and open the valve assembly 10.

The indicator stem 38 has a lower portion that sits within a cavity 126 in the top of the piston 90 and is in slidable abutting contact with a bottom surface 128 of the cavity 126. The indicator stem 38 extends through an opening 130 in an upper wall 134 of the piston driver 92. The opening 130 provides sufficient clearance for the indicator stem 38 to rotate within the opening 130 and move axially through the opening 130 relative to the upper wall 134 of the piston driver 92. A biasing spring 140 is disposed between an upper wall 146 of the handle 40 and an upper ledge 148 of the indicator stem 38 to bias the indicator stem 38 downward toward the bottom surface 128 of the cavity 126. At its upper end, the indicator stem 38 includes a tab 152 having an oblong rectangular shape that twists slightly to form a spiral cam surface 154 from its lower portion 156 near the ledge 148 to its upper distal end 158. The upper wall 146 of the handle 40 has a correspondingly shaped opening 160 that enables sliding and rotating, or twisting, of the cam 154 of the tab 152 therethrough. As will be appreciated, as the handle 40 and accordingly the piston driver 92 are rotated to move the piston 90 axially upward along the Y axis, for example from the closed position in FIG. 3 to the open position in FIG. 4, the piston 90, as it overcomes the bias in the spring 140, urges the indicator stem 38 upwardly through the opening 130 in the piston driver 92. As the indicator stem 38 is urged upwardly, the cam 154 of the tab 152 slides along the inside surface of the opening 160 in the upper wall 146 of the handle 40, which has the effect of rotating the tab 152 and therefore the indicator stem 38 as the tab 152 slides through the opening 160. As shown in FIG. 4, in the open position, the tab 152 of the indicator stem 38 projects above the upper wall 146 of the handle 40, thus serving to indicate that the valve assembly 10 is open.

As best seen in FIG. 4, the indicator stem 38 further includes the opening 48. The opening 48 extends transverse to the axis of vertical movement of the indicator stem 38, that is transverse to the Y axis in the illustrated embodiment. As best seen in FIG. 3, the opening 48 may be at a slight angle A relative to a horizontal plane P that is parallel to the longitudinal axis X. In the illustrated embodiment, the angle A is about 2.5 to 3 degrees.

The valve housing 18 and handle 40 likewise include openings 44, 46 that extend transverse to the Y axis. The openings 44, 46 in the illustrated embodiment are likewise oriented at an angle A of about 2.5 to 3 degrees relative to the horizontal plane P. The openings 44 in the valve housing 18 are disposed at opposite sides of the valve assembly 10 in the upper portion 72 of the valve housing 18. In the illustrated embodiment, the openings 44 are disposed at the left and right sides of the housing as viewed in FIGS. 3 and 4; in other words, 180 degrees apart when viewed looking down the Y axis, or respectively above the inlet and outlet port tubes 20, 22 of the valve assembly 10. The openings 46 in the handle 40 are disposed at opposite sides of the handle 40. In the illustrated embodiment, the openings 46 are positioned 180 degrees apart from a view down the Y axis. Rotation of the handle 40 causes the openings 46 in the handle 40 to move into and out of alignment, both angularly about the Y axis and axially along the Y axis, with the openings 44 in the valve housing 18, and into and out of angular and axial alignment with the opening 48 in the indicator stem 38. The openings 44, 46, 48 are suitably sized to receive a lockout member 50, for example the shackle of a lock.

FIGS. 3 and 4 show the valve assembly 10 in respective closed and open positions. As shown in FIG. 3, turning the handle 40 to close the valve assembly 10 positions the openings 46 in the handle 44 into angular and axial alignment with the openings 44 in the valve housing 18, and into angular and axial alignment with the opening 48 in the indicator stem 38. In FIG. 3, the openings 44, 46, 48 align along an alignment axis L. As will be appreciated, the alignment axis L corresponds to the angle A at which the openings 44, 46, 48 are disposed in the respective housing 18, handle 40, and indicator stem 38, which in the illustrated embodiment is about 2.5 to 3 degrees relative to the horizontal plane P. With the openings 44, 46, 48 so aligned, a lockout member such as the lock 50 can be inserted through the openings 44, 46, 48. As will be appreciated, the shackle of the lock 50 prevents rotational movement of the handle 40 and thus locks the valve assembly 10 in the closed positioned. The lockout member 50 can prevent unexpected or unauthorized access to the valve assembly 10, for example during maintenance thereof. The lockout member 50 can be tagged for appropriate identification of a lockout procedure or the like.

The valve assembly 10 can be opened by removing the lockout member 50 and turning the handle 40. Turning the handle 40 for example to the position shown in FIG. 4 urges the piston 90 and indicator stem 38 upward along the Y axis. It is noted that in the FIG. 4 open position, which is a 360 degrees turn of the handle 40 from the closed position, the openings 46 in the handle 40 are in angular and axial alignment with the openings 44 in the valve housing 18. However, as the indicator stem 38 is urged upward, the tab 152 of the indicator stem 38 slides through the opening 160 in the upper wall 146 of the handle 40 and, owing to the tab's spiral cam surface 154, rotates the indicator stem 38. As such, the opening 48 in the indicator stem 38 rises above and thus out of axial alignment with the openings 46 in the handle 40 and the openings 44 in the valve housing 18. As will be appreciated, turning the handle 40 to any open position for example as shown in FIG. 4 has the effect of moving the opening 48 in the indicator stem 38 out of axial alignment along the Y axis with the openings 46 in the handle 40 and the openings 44 in the valve housing 18. As the openings 44, 46, 48 are out of alignment, the valve assembly 10 cannot be locked for example by the lockout member 50. Attempts to insert a lockout member 50 will be obstructed by for example the outer wall of the handle 40 or the body of the indicator stem 38. The tab 152, projecting upward relative to the upper wall 146 of the handle 40, serves as an indicator that the valve assembly 10 is open and unable to be locked.

The handle 40 can be turned to other open positions as well, for example, to 90 degrees or 180 degrees from the closed position. At 90 degrees, the outer wall of the handle 40 angularly between the openings 46 of the handle 40 blocks the openings 44 in the valve housing 18 and thus prevents insertion of a lockout member 50. At 180 degrees, the openings 46 in the handle 40 switch sides such that instead of the openings 46 declining from left to right in FIG. 3 (where the openings 46 are in alignment with the openings 44, 48 to permit lockout) the openings 46 incline from left to right. As such, the center of the left side opening 46 in the handle 40 falls below and thus out of axial alignment with the center of the left side opening 44 in the valve housing 18, and the center of the right side opening 46 in the handle 40 rises above and thus out of axial alignment with the center of the right side opening 44 in the valve housing 18, thus causing the openings 46 in the handle 40 to be out of axial alignment along the Y axis with the openings 44 in the valve housing 18, and preventing insertion of a lockout member 50.

The valve assembly 10 of FIGS. 1-4 may be a multi-turn actuation type valve assembly. For such a valve assembly, the handle 40 can be turned greater than 360 degrees between the closed position and any number of open positions. It will be appreciated that for such a multi-turn actuation type valve the openings 46 in the handle 40 will angularly and axially align with the openings 44 in the valve housing 18 every 360 degrees, or full, turn of the handle 40 from the closed position. As noted above, however, when the valve assembly 10 is opened to such a 360 degrees position, although the openings 46 in the handle 40 align with the openings 44 in the valve housing 18, the opening 48 in the indicator stem 38 does not. The indicator stem 38, rather, is in a raised position for example as shown in FIG. 4, with its opening 48 axially above and thus out of axial alignment with the openings 46 in the handle 40 and the openings 44 in the valve housing 18. As such, attempts to insert a locking member 50, although capable of passing through the aligned openings 44, 46 in the handle 40 and valve housing 18, will nonetheless be obstructed by the body of the indicator stem 38. Thus, the valve assembly 10 of FIGS. 1-4 having such an indicator stem 38 can only be locked out when the valve assembly 10 is in the closed position; in the open position, the indicator stem 38 will not permit locking, and misalignment in the openings 46 in the handle 40 relative to the openings 44 in the valve housing 18 will also not permit locking.

It will be appreciated that the valve assembly 10 need not be limited to the configuration shown in FIGS. 1-4, and other embodiments are contemplated. For example, the valve assembly 10 may be a partial turn actuation type valve in which the handle 40 and the valve actuator 34 are only partially rotatable, that is less than 360 degrees, in moving the valve assembly from a closed position to a fully open position. For such a partial turn actuation type valve, in the closed position, the openings 44, 46, 48 align along the alignment axis L to permit lockout. In an open position, however, that is with the handle 40 turned to for example 90 degrees or 180 degrees, the openings 46 in the handle 40 move out of angular and axial alignment with the openings 44 in the valve housing 18 and the opening 48 in the indicator stem 38, thus preventing lockout. It will be appreciated that for such a partial turn actuation type valve, the indicator stem 38 can be omitted, since the handle 40 alone can enable lockout in the closed position and prevent lockout in the open positions. Thus, where the valve assembly 10 is structured as a partial turn actuation type valve, here too the valve assembly 10 can only be locked out in the closed position; in the open position, misalignment in the openings 46 in the handle 40 relative to the openings 44 in the valve housing 18 will not permit locking. The indicator stem 38, if provided in such a partial actuation type valve, will also not permit locking in the open position.

The valve assembly 10 of FIGS. 1-4 has its openings 44, 46, 48 each disposed at an angle A of 2.5 to 3 degrees relative to the horizontal plane P. It will be appreciated that the valve assembly 10 need not be limited as such. In an embodiment, the openings 44, 46, 48 may be oriented at an angle of zero degrees relative to the horizontal plane P, that is perpendicular to the Y axis. For such a valve, the openings 46 in the handle 40 will angularly and axially align with the openings 44 in the valve housing 18 every 180 degrees, or half, turn of the handle 40. When the valve assembly 10 is closed, the openings 44, 46, 48 will angularly and axially align with one another, that is horizontally align for an angle A of zero degrees, to permit insertion of a lockout member 50. When the valve assembly 10 is opened as by turning the handle 40 for example 180 degrees, however, although the openings 46 in the handle 40 align with the openings 44 in the valve housing 18 where the angle A is zero degrees, the opening 48 in the indicator stem 38 does not. As the handle 40 is turned to open the valve, the indicator stem 38 and its opening 48 rise above and thus out of axial alignment with the openings 46 in the handle 40 and the openings 44 in the valve housing 18. As such, attempts to insert a locking member 50, although capable of passing through the aligned openings 44, 46 in the handle 40 and valve housing 18, will nonetheless be obstructed by the body of the indicator stem 38. Thus, where the valve assembly 10 is structured such that the angle A is zero, here too the valve assembly 10 can only be locked out in the closed position; in the open position, the indicator stem 38 will not permit locking. Misalignment in the openings 46 in the handle 40 relative to the openings 44 in the valve housing 18 will also not permit locking.

Turning now to FIGS. 5-8, another exemplary embodiment of a valve assembly 210 is illustrated. The valve assembly 210 of FIGS. 5-8 is in many respects similar to the above-referenced valve assembly 10 of FIGS. 1-4, and consequently the same reference numerals but indexed by 200 are used to denote structures corresponding to similar structures in the valve assembly 10. In addition, the foregoing description of the valve assembly 10 of FIGS. 1-4 is equally applicable to the valve assembly 210 of FIGS. 5-8 except as noted below. Moreover, it will be appreciated upon reading and understanding the specification that aspects of the valve assemblies 10, 210 may be substituted for one another or used in conjunction with one another where applicable.

Figure 7:
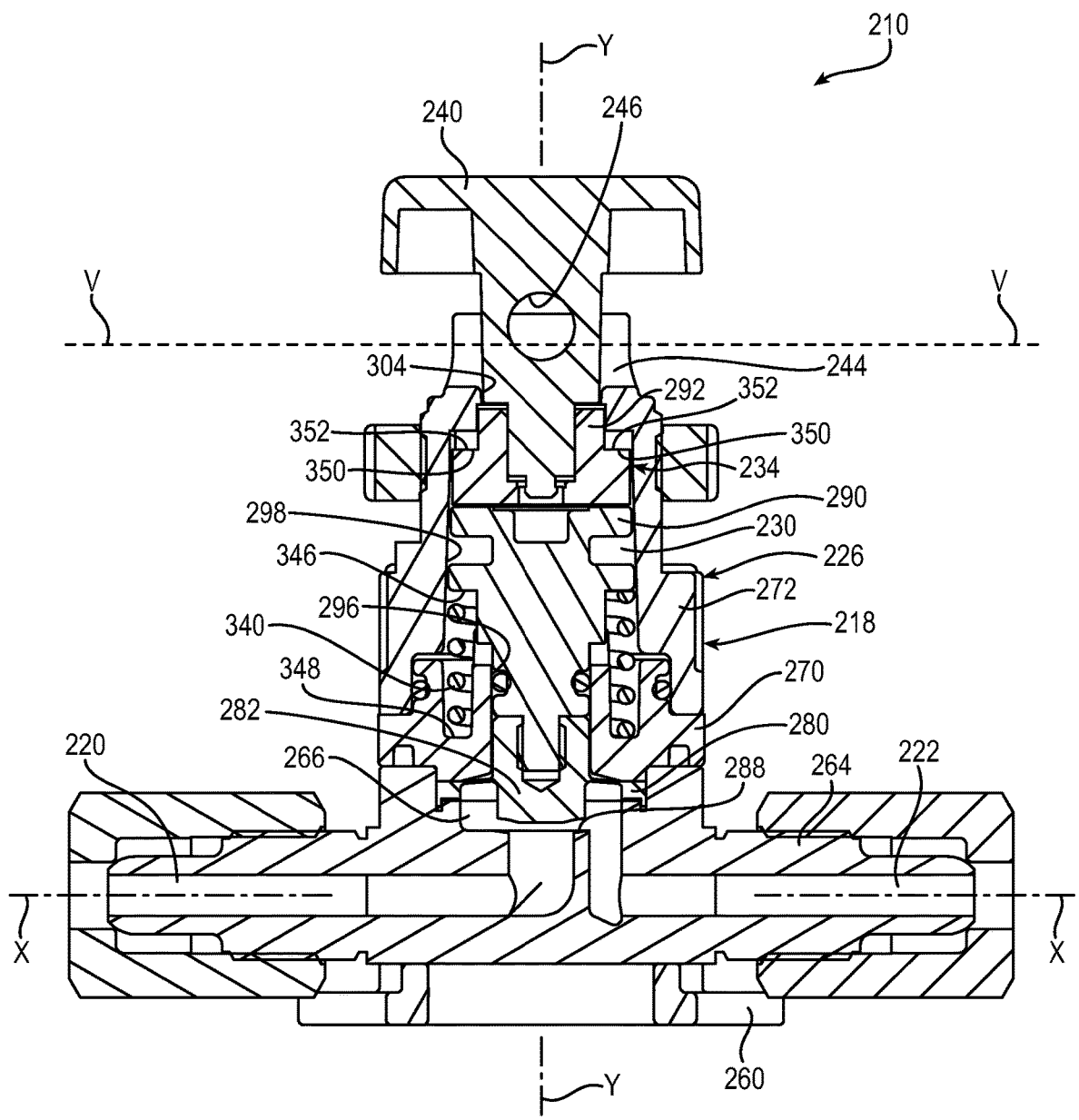
FIG. 7 is a cross sectional view of the FIG. 5 valve assembly as viewed from the line 7-7 in FIG. 6, showing the valve assembly in an open position.
Figure 8:
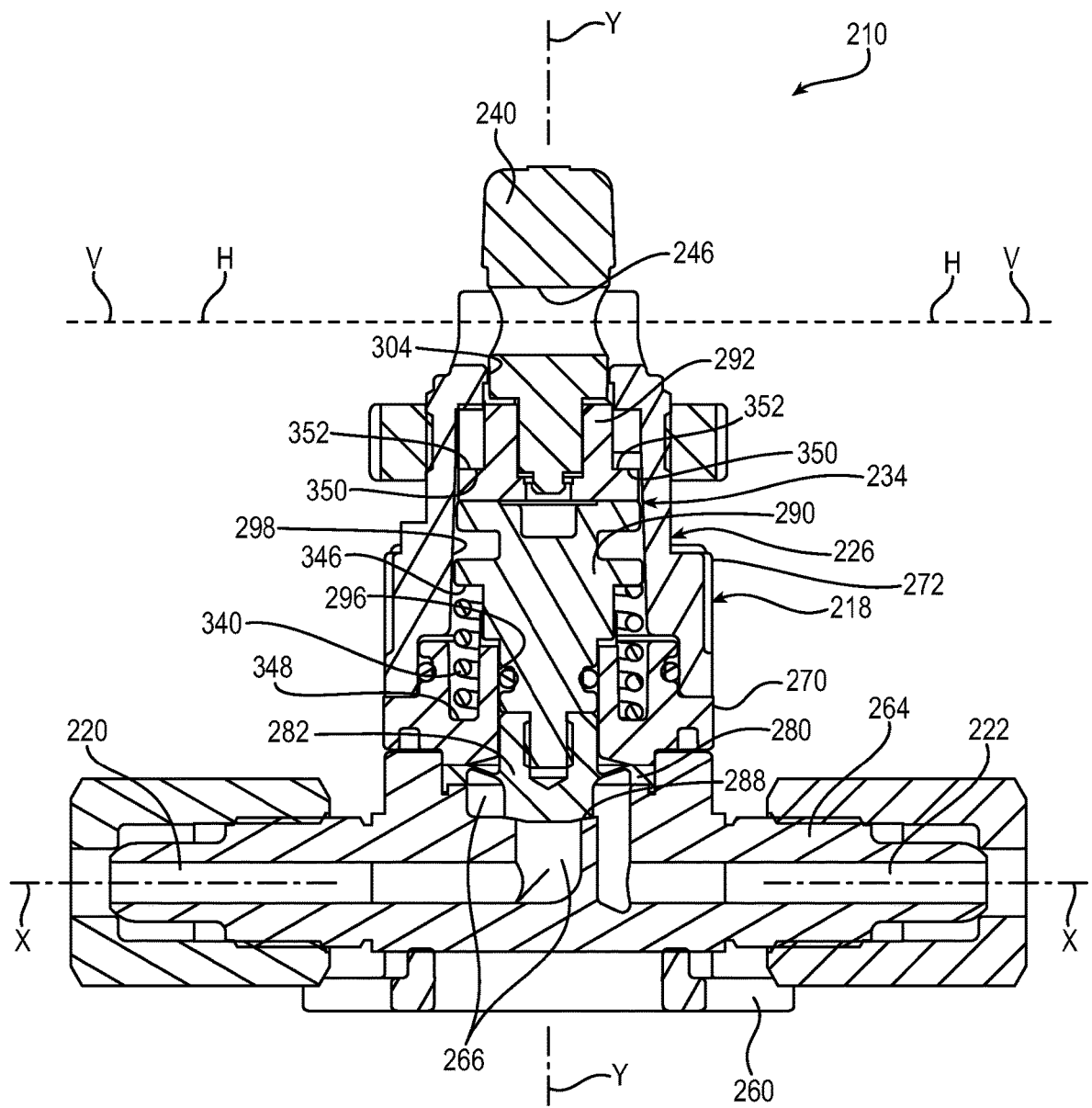
FIG. 8 is a cross sectional view of the FIG. 5 valve assembly as viewed from the line 7-7 in FIG. 6, but with the valve assembly in a closed position.

The valve assembly 210 includes a valve housing 218 that has an inlet port tube 220 and an outlet port tube 222 along a generally longitudinal axis X and a central body 226 along a generally vertical axis Y. The central body 226 includes a valve chamber 230 in which a valve actuator 234 is supported for movement between open and closed positions to respectively open and close the valve assembly 210 as shown in FIGS. 7 and 8. A handle 240 is coupled to the valve actuator 234 to move the valve actuator 234 between the open and closed positions. The valve housing 218 and the handle 240 have respective openings 244, 246 that can be moved into and out of alignment by rotation of the handle 240. As will be described in greater detail below, turning the handle 240 to move the valve actuator 234 to a closed position has the effect of moving the openings 244, 246 into alignment. In such closed state, as shown in FIG. 8, a lockout member such as a lock (as shown in FIGS. 1-3) can be inserted through the openings 244, 246 (and tagged if desired) to prevent unexpected or unauthorized access to the valve assembly 210, for example during maintenance thereof. On the other hand, turning the handle 240 to move the valve actuator 234 to any variety of open positions has the effect of moving the openings 244, 246 out of alignment. In such open states, as shown for example in FIG. 7, the valve assembly 210 cannot be locked out. In the illustrated embodiment of FIGS. 5-8, the valve assembly 210 can be locked out tagged out in the closed position, and the lockout tagout feature is incorporated into the valve assembly 210 itself.

Referring now in greater detail to FIGS. 7 and 8, the valve housing 218 includes a base plate 260 and a valve body 264 mounted thereon. The valve body 264 includes the inlet and outlet port tubes 220, 222, shown respectively in the left and right in FIGS. 7 and 8, and an intermediate passage 266 forming a bottom portion of the valve chamber 230. The central body 226 of the valve housing 218 includes a lower housing 270 and an upper housing 272, which together define an upper portion of the valve chamber 230. As will be appreciated, the intermediate passage 266 enables fluid communication between the inlet and outlet port tubes 220, 222. As will further be appreciated, either port tube 220 or 222 can function as an inlet or outlet port tube. The valve housing 218 can be made of any suitable material including polytetrafluoroethylene, stainless steel, or a hard thermoplastic such as ETFE or PVDF.

The valve actuator 234, mounted within the chamber 230, includes a diaphragm 280 that separates the upper and lower portions of the valve chamber 230. The diaphragm 280 is supported at its edge by the lower housing 270 above and the valve body 264 below. The diaphragm 280 includes a centrally located plug 282 and is made of a suitable material such as PTFE, PFA, variations thereof, and/or other materials, to enable flexible vertical movement of the plug 282 along the Y axis. The plug 282 is adapted for sealing against a valve seat 288 of the valve body 264. The plug 282 is moveable between the open position (FIG. 7) and the closed position (FIG. 8) whereat fluid can flow from the inlet port tube 220, through the intermediate passage 266, and to the outlet port tube 222.

The valve actuator 234 includes a piston 290 and a piston driver 292. The piston 290 is mounted for slidable movement along the Y axis within a bore 296 of the lower housing 270. At its lower end, the piston 290 is fixedly connected to the diaphragm 280 so that upward and downward movement of the piston 290 causes upward and downward flexure in the diaphragm 280 and corresponding sealing and unsealing of the plug 282 relative to the valve seat 284. At its upper end, the piston 290 abuts the piston driver 292. The piston driver 292 is mounted for slidable movement along the Y axis within a bore 298 of the upper housing 272. The handle 240, in turn, is coupled to the upper end of the piston driver 292. The handle 240 is axially and rotatably movable within an opening 304 in the upper housing 272. A biasing spring 340 is disposed between an outer ledge 346 of the piston 290 and an upwardly facing annular surface 348 of the lower housing 270 to bias the piston 290 and the piston driver 292 upward toward the bottom of the handle 240. The upper housing 272 has an interior ramp or cammed surface 350. The piston driver 282 has a corresponding exterior ramp or cammed surface 352 that slides angularly upward and downward against the interior cammed surface 350 as the handle 292 and piston driver 292 are rotated. As will be appreciated, owing to the sliding surface contact between the cammed surface 352 of the piston driver 292 and the cammed surface 350 of the upper housing 272, and the upward bias of the spring 340, clockwise and counterclockwise rotation of the handle 240 serves to drive the piston driver 292 and the piston 290 respectively downward and upward, which, in turn, urges the diaphragm 280 and plug 282 to respectively close and open the valve assembly 210. The driver piston 292 and upper housing 272 can include cooperating notches or the like that provide a tactile indication and slight resistance to rotation of the handle 292 into and out of the closed position.

The valve housing 218 and handle 240 each include an opening 244, 246 that extends transverse to the Y axis. The openings 244, 246 in the illustrated embodiment are oriented at an angle of zero degrees relative to a horizontal plane that is parallel to the longitudinal axis X. In other words, the openings 244, 246 are oriented perpendicular to the Y axis. The openings 244, 246 are suitably sized to receive a lockout member 50, for example the shackle of a lock (as shown in FIGS. 1-3 for example).

FIGS. 7 and 8 show the valve assembly 210 in respective open and closed positions. Referring first to FIG. 8, turning the handle 240 to close the valve assembly 210 causes the handle 240 to move downward along the Y axis and to rotate about the Y axis, owing to the threaded coupling between the handle 240 and the internal thread 304 of the upper housing 272. The downward movement of the handle 240 along the Y axis has the effect of axially lowering the opening 246 in the handle 240 to the Y axis height of the opening 244 in the valve housing 218. The rotational movement of the handle 240 about the Y axis has the effect of moving the opening 246 in the handle 240 into angular alignment with the opening 244 in the valve housing 218. With the openings 244, 246 so aligned, a lockout member such as the lock 50, can be inserted through the openings 244, 246. As will be appreciated, the shackle of the lock 50 prevents rotational movement of the handle 240 and thus locks the valve assembly 210 in the closed positioned. The lockout member 50 can prevent unexpected or unauthorized access to the valve assembly 210, for example during maintenance thereof. The lockout member 50 can be tagged for appropriate identification of a lockout procedure or the like. As will be appreciated, for such a quarter turn actuation type valve, the valve assembly 210 can only be locked out in the closed position.

The valve assembly 210 can be opened by removing the lockout member 50 and turning the handle 240. Turning the handle 240 to open the valve assembly 210 causes the handle 240 to move upward along the Y axis and to rotate about the Y axis, again owing to the sliding surface contact between the cammed surface 352 of the piston driver 292 and the cammed surface 350 of the upper housing 272, and the upward bias of the spring 340. The upward movement of the handle 240 along the Y axis has the effect of raising the opening 246 in the handle 240 to above the Y axis height of the opening 244 in the valve housing 218. The rotational movement of the handle 240 about the Y axis has the effect of rotating the opening 246 in the handle 240 out of angular alignment with the opening 244 in the valve housing 218. As will be appreciated, turning the handle 240 to any open position for example as shown in FIG. 7 has the effect of moving the opening 246 in the handle 240 out of axial and angular alignment with the opening 244 in the valve housing 218. As the openings 244, 246 are out of alignment, the valve assembly 210 cannot be locked for example by the lockout member 50. Attempts to insert a lockout member 50 will be obstructed by the outer wall of the handle 240.

In the embodiment of FIGS. 5-8, the valve assembly 210 is a quarter turn type valve and the alignment of the openings 244, 246 follows such quarter turn scheme. Thus, the handle 240 is rotated a quarter turn, or 90 degrees, counterclockwise about the Y axis to urge the valve actuator 234 from the closed position in FIG. 8 to the open position in FIG. 7, thereby opening the valve assembly 210. As the handle 240 is rotated a quarter turn counterclockwise, the axis H of the opening 246 in the handle 240 likewise rotates a quarter turn to a position at right angles, that is 90 degrees, relative to the axis V of the opening 244 in the valve housing 218. Similarly, the handle 240 is rotated a quarter turn, or 90 degrees, clockwise about the Y axis to urge the valve actuator 234 from the open position in FIG. 7 to the closed position in FIG. 8, thereby closing the valve assembly 210. As the handle 240 is rotated a quarter turn clockwise, the axis H of the opening 246 in the handle 240 likewise rotates a quarter turn to align with the axis V of the opening 244 in the valve housing 218.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A valve assembly, comprising:
a valve housing; and a handle that is movable about an actuation axis to actuate a valve actuator within the valve housing between an open position and a closed position;

wherein the handle has at least one first opening and the valve housing has at least one second opening, wherein when the valve actuator is in the closed position the at least one first opening aligns with the at least one second opening to enable receipt of a lockout member that prevents movement of the valve actuator from the closed position to the open position;

wherein the open position of the valve includes rotational amounts of the handle from the closed position of 360 degrees and greater than 360 degrees;

wherein the handle is not movable axially relative to the valve housing; and wherein the first and second openings extend through and transverse to the actuation axis.

2. The valve assembly of claim 1, wherein the at least one first opening of the handle comprises a pair of first openings at opposite sides of the handle and the at least one second opening of the valve housing comprises a pair of second openings at opposite sides of the valve housing, and wherein when the valve actuator is in the closed position the pair of first openings and the pair of second openings are aligned to enable receipt of the lockout member.

3. The valve assembly of claim 1, wherein the at least one first opening and the at least one second opening are both oriented perpendicular to the actuation axis.

4. The valve assembly of claim 1, wherein the at least one first opening and the at least one second opening are both oriented at a non-zero angle relative to a horizontal plane perpendicular to the actuation axis.

5. The valve assembly of claim 4, wherein the non-zero angle is about 2.5 to 3 degrees.

6. The valve assembly of claim 1, comprising:

an indicator stem configured for slidable movement relative to the handle in response to movement of the handle;

wherein the indicator stem has a third opening, wherein when the valve actuator is in the closed position the at least one first opening aligns with the third opening to enable receipt of the lockout member to prevent movement of the valve actuator from the closed position to the open position.

7. The valve assembly of claim 6, wherein when the valve actuator is in the open position the at least one first opening is out of alignment with the third opening.

8. The valve assembly of claim 6, wherein when the valve actuator is in the open position the at least one first opening and the at least one second opening are both out of alignment with the third opening.

9. The valve assembly of claim 6, wherein when the valve actuator is in the open position the at least one first opening is out of alignment with the at least one second opening.

10. The valve assembly of claim 6, wherein the indicator stem has a cam that slides through a vertically extending opening in a wall of the handle as the handle moves to actuate the valve actuator between the closed position and the open position.

11. The valve assembly of claim 6, wherein the at least one first opening of the handle comprises a pair of first openings at opposite sides of the handle and the at least one second opening of the valve housing comprise a pair of second openings at opposite sides of the valve housing, and wherein when the valve actuator is in the closed position the pair of first openings, the pair of second openings, and the third opening are aligned to enable receipt of the lockout member.

12. The valve assembly of claim 1, wherein the at least one first opening angularly aligns with the at least one second opening about the actuation axis when the valve actuator is in the closed position.

13. The valve assembly of claim 1, wherein the position of the at least one first opening when the valve actuator is in the open position is 90 degrees away from the position of the at least one first opening when the valve actuator is in the closed position.

14. The valve assembly of claim 1, wherein the at least one first opening axially aligns with the at least one second opening along the actuation axis when the valve actuator is in the closed position.

15. The valve assembly of claim 1, wherein the at least one first opening and the at least one second opening are adjacent to each other transverse to the actuation axis when the valve actuator is in the closed position.

* * * * *